United States Patent
Minto

(10) Patent No.: US 7,441,628 B2
(45) Date of Patent: Oct. 28, 2008

(54) WELLBORE SIGNAL GENERATOR

(75) Inventor: James Minto, Houston, TX (US)

(73) Assignee: Z-Seis Corporation, Houston, TX (US)

( * ) Notice: Subject to any disclaimer, the term of this patent is extended or adjusted under 35 U.S.C. 154(b) by 244 days.

(21) Appl. No.: 10/965,137

(22) Filed: Oct. 14, 2004

(65) Prior Publication Data

US 2006/0081413 A1 Apr. 20, 2006

(51) Int. Cl.
*G01V 1/00* (2006.01)

(52) U.S. Cl. ........................ 181/111; 181/121; 181/113; 181/124; 181/112

(58) Field of Classification Search .................. 181/111, 181/121, 113, 124, 108, 112, 122, 106; 166/177.6, 166/177.1; 367/14, 25, 188, 82, 35, 105; 310/334, 322

See application file for complete search history.

(56) References Cited

U.S. PATENT DOCUMENTS

| | | | |
|---|---|---|---|
| 4,700,803 A * | 10/1987 | Mallett et al. | ............... 181/106 |
| 4,715,470 A | 12/1987 | Paulsson | |
| 4,783,771 A | 11/1988 | Paulsson | |
| 4,821,246 A | 4/1989 | Van Kampen et al. | |
| 5,047,992 A * | 9/1991 | Howlett | ........................ 367/31 |
| 5,109,698 A * | 5/1992 | Owen | ........................... 73/632 |
| 5,131,488 A * | 7/1992 | Green et al. | ................. 181/106 |
| 5,137,109 A | 8/1992 | Dorel | |
| 5,210,381 A * | 5/1993 | Brett | ........................... 181/106 |
| 5,321,333 A * | 6/1994 | Walden et al. | ............... 310/333 |
| 5,477,101 A * | 12/1995 | Ounadjela | ................... 310/334 |
| 5,555,220 A | 9/1996 | Minto | |
| 5,852,262 A | 12/1998 | Gill et al. | |
| 6,193,010 B1 | 2/2001 | Minto | |
| 6,474,439 B1 * | 11/2002 | Hoyle et al. | ................. 181/102 |
| 6,782,970 B2 * | 8/2004 | Chang | ........................ 181/101 |

OTHER PUBLICATIONS

International Search Report and Written Opinion for Appl. No. PCT/US05/36753 dated Oct. 23, 2006 (6 p.).

* cited by examiner

*Primary Examiner*—Lincoln Donovan
*Assistant Examiner*—Forrest Phillips
(74) *Attorney, Agent, or Firm*—Conley Rose, P.C.

(57) ABSTRACT

Methods and apparatus for generating a signal with a signal generator comprising a tool body disposed in a tubular member. A first and second electromagnets are disposed within the tool body such that the second electromagnet is opposite the first electromagnet. A power supply selectively provides electrical current to the first and second electromagnets so as to displace the tubular member and generate a signal in the surrounding formation.

29 Claims, 6 Drawing Sheets

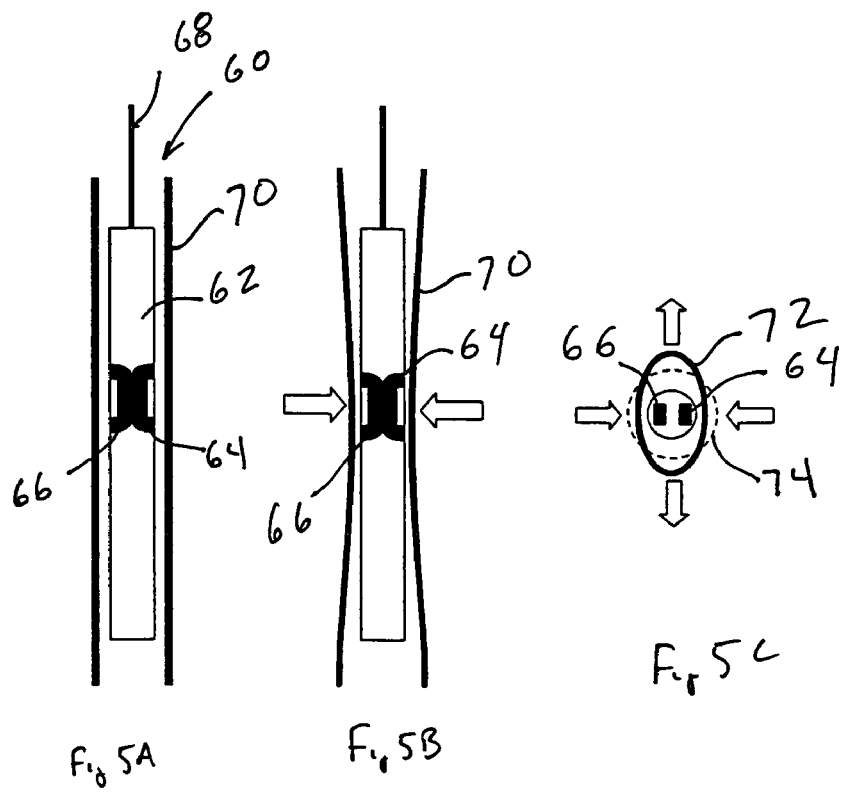
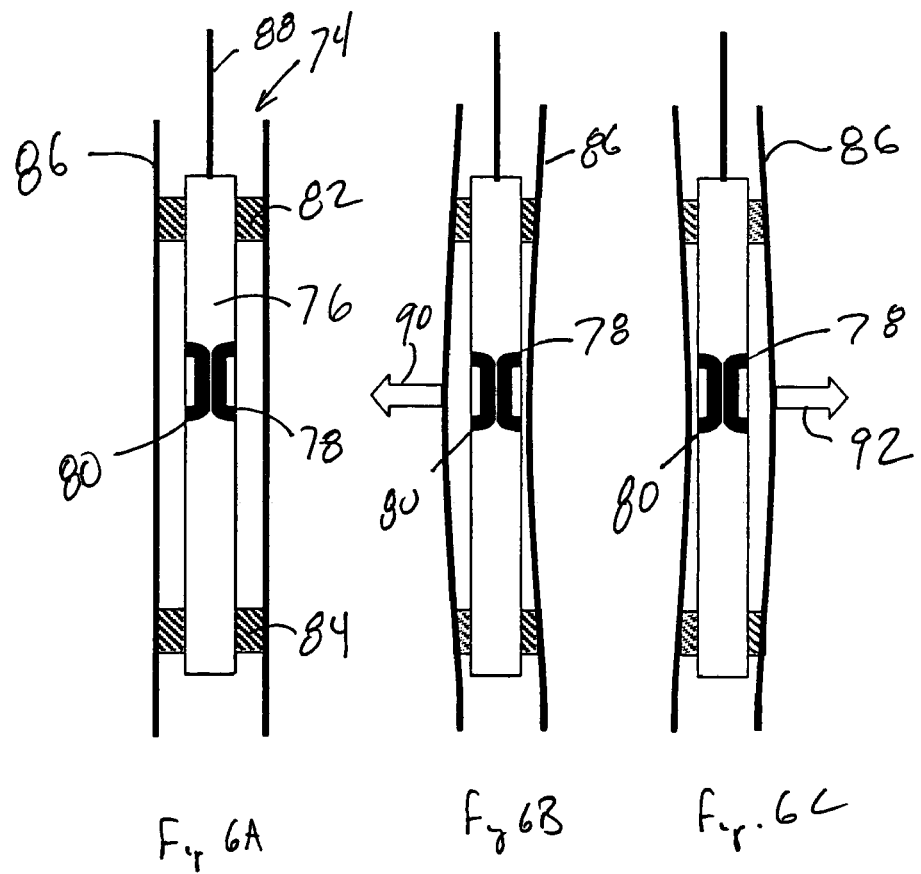

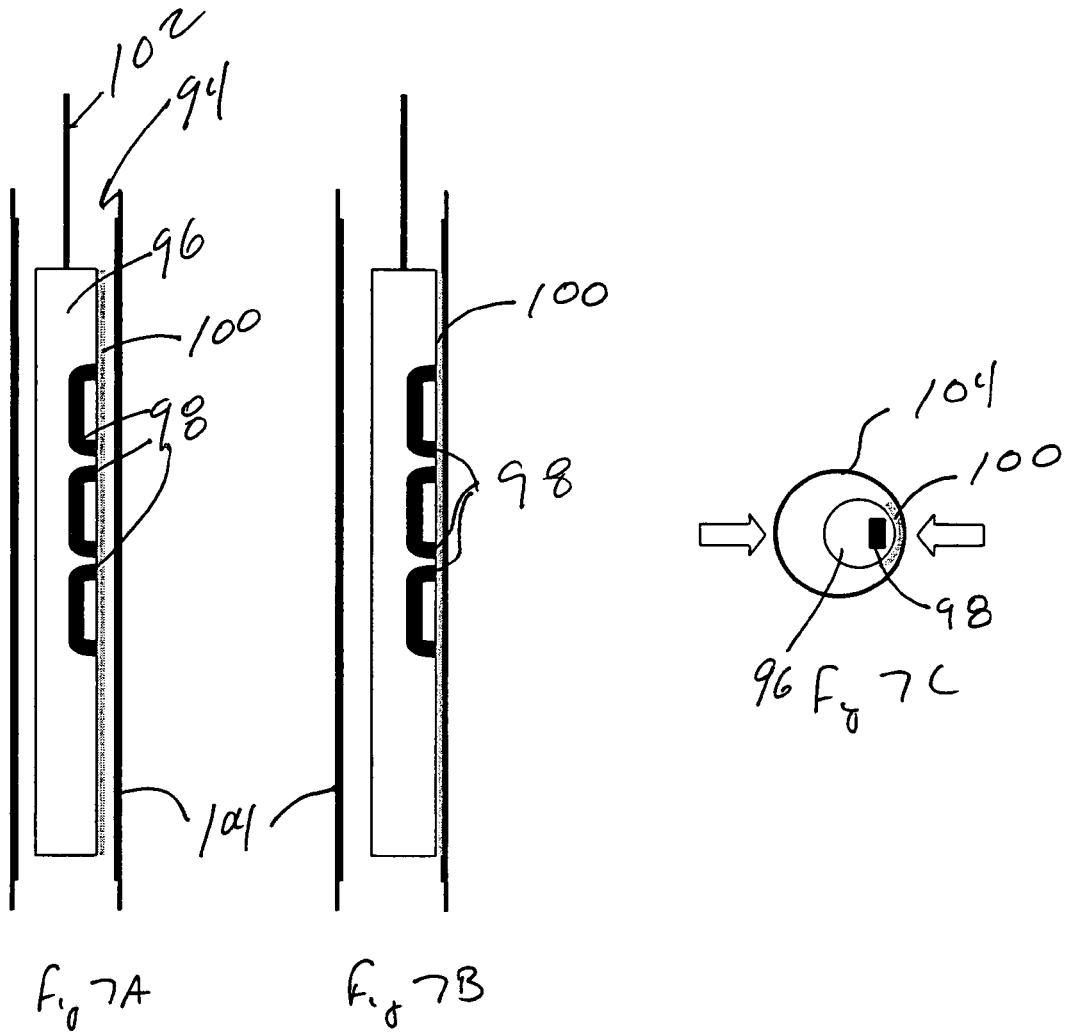
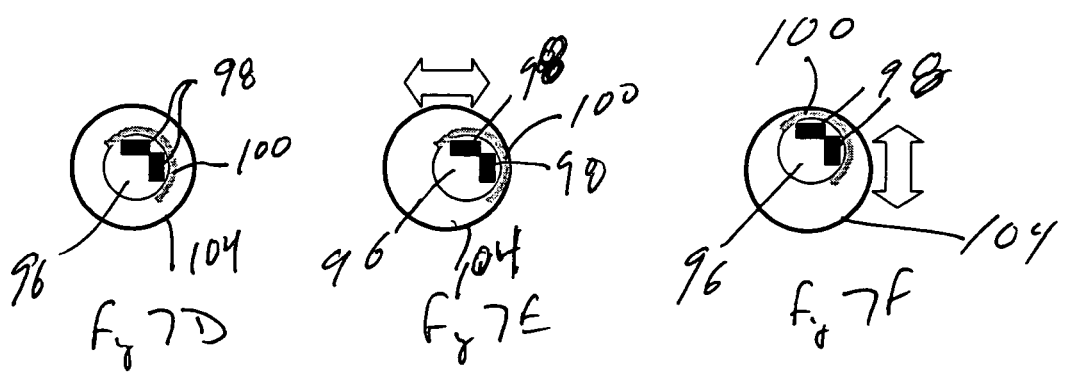

WELLBORE SIGNAL GENERATOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to methods and apparatus for seismic exploration systems and more particularly to borehole deployed seismic systems. Still more particularly, the present invention relates to methods and apparatus for generating seismic, acoustic, or other signals within a borehole.

High-resolution seismic formation evaluation methods have been enabled by technology such as three-dimensional vertical seismic profiling (3-D VSP) and crosswell seismic tomography. These technologies can provide high-grade imaging data gathered from certain formations and fluids within a reservoir. This imaging data can be used by an operator to target areas within the formation most likely to produce hydrocarbons, thus resulting in improved production at reduced costs.

Borehole seismic surveys have been available since the late 1970's in the form of vertical seismic profiles (VSP) that are acquired using surface energy sources and receivers deployed in a single wellbore. Receiver tools have also been deployed in the wellbore that allow acquiring large 3-D VSP data sets from a grid of source points on the surface received by a plurality of receiver levels in the wellbore. In certain situations, such as those with environmental restrictions on surface source placement, a reverse 3-D VSP system may be used where the seismic receivers are deployed in an array at the surface and the seismic source is deployed within the wellbore. Large subsurface volumes can be interrogated using 3-D VSP to provide high-resolution imaging of a volume around a wellbore.

Crosswell seismic technology performs the seismic survey from within the reservoir by deploying a seismic source in one wellbore and deploying seismic sensors into one or more adjacent wellbores in the same reservoir. High-bandwidth data is collected between the wells, directly across the reservoir, or other zone of interest. Crosswell seismic systems can provide greater vertical resolution than is possible with surface seismic information. The measurements taken with crosswell technology can also be directly referenced in depth, allowing correlation with well logging data.

Borehole seismic sources are used routinely in crosswell surveys but have not realized their potential in reverse VSP because they are generally low-powered, high-frequency, or unreliable. Commercially available seismic sources can be categorized as impulsive sources or swept frequency sources. Impulsive sources, such as bolt air guns, sparkers, and explosives, generate high power but can cause damage to casing and cement. Impulsive sources also limited by depth restrictions.

Current swept frequency source technology falls into two categories, fluid-coupled and clamped. The fluid-coupled sources are operationally simple and cause no borehole damage, but suffer from low output, particularly at low frequencies. In addition, fluid-coupled sources must be operated in fluid filled wells, thus limiting their use in gas reservoirs. Clamped sources provide improved performance at low frequencies but can cause casing damage and are generally more complicated and expensive to deploy and operate.

Accordingly, it would be desirable to have a borehole seismic source providing high power and good low frequency response while being less complex, more reliable, and less likely to damage the casing. Thus, there remains a need to develop methods and apparatus for generating a seismic signal in a borehole, which overcome some of the foregoing difficulties while providing more advantageous overall results.

SUMMARY OF THE PREFERRED EMBODIMENTS

The embodiments of the present invention are directed toward methods and apparatus for generating a seismic signal with a signal generator comprising a tool body disposed in a casing. A first and second electromagnets are disposed within the tool body such that the second electromagnet is opposite the first electromagnet. A power supply selectively provides electrical current to the first and second electromagnets so as to displace the casing and generate a seismic signal in the surrounding formation.

In one embodiment, a signal generator comprises a tool body operable to be disposed in a casing. A first electromagnet is disposed within the tool body, which may be suspended on and powered through, a wireline. A second electromagnet is disposed within the tool body opposite the first electromagnet. A power supply is operable to selectively provide electrical current to the first and second electromagnets so as to displace the casing. In certain embodiments, the power supply generates electrical current in a rectified sine wave drive sweep such that the first electromagnet is energized when the second electromagnet is not energized so as to generate a vibrating displacement in the casing.

The signal generator may also comprise a third electromagnet that is oriented perpendicular to the first electromagnet and a fourth electromagnet disposed opposite the third electromagnet. The power supply may generate an electrical current in a drive sweep such that the four electromagnets are energized in series so as to generate a rotating displacement in the casing. In other embodiments, the first and second electromagnets can be energized followed by the third and fourth electromagnets being energized so as to create two distinct signals that can be combined into three-dimensional data.

In another embodiment, a signal generator comprises a plurality of electromagnets disposed about a tool body disposed in a wellbore casing and a power supply operable to provide electrical current to the plurality of electromagnets so as to create a displacement of the casing. The power supply may create a vibrating or rotating displacement of the casing. The plurality of electromagnets may comprises a pair of electromagnets oriented in opposite directions or may comprise four electromagnets oriented at ninety degree intervals.

The present invention may also be embodied as a method of generating a seismic signal in a formation by disposing a tool in a wellbore casing, wherein the tool comprises a plurality of electromagnets, supplying electrical power to the tool, and selectively applying the electrical power to the electromagnets so as to generate a displacement in the casing. The displacement in the casing may be a vibrating or rotating displacement. In certain embodiments, the tool is sized so as to minimize an annular area formed between the tool and the wellbore casing.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIGS. 5A-5C illustrate the configuration and operation of a signal generator in accordance with embodiments of the invention;

FIGS. 6A-6C illustrate the configuration and operation of a signal generator in accordance with embodiments of the invention;

FIGS. 7A-7F illustrate the configuration and operation of a signal generator in accordance with embodiments of the invention.

DETAILED DESCRIPTION OF THE PREFERRED EMBODIMENTS

Figure 1:
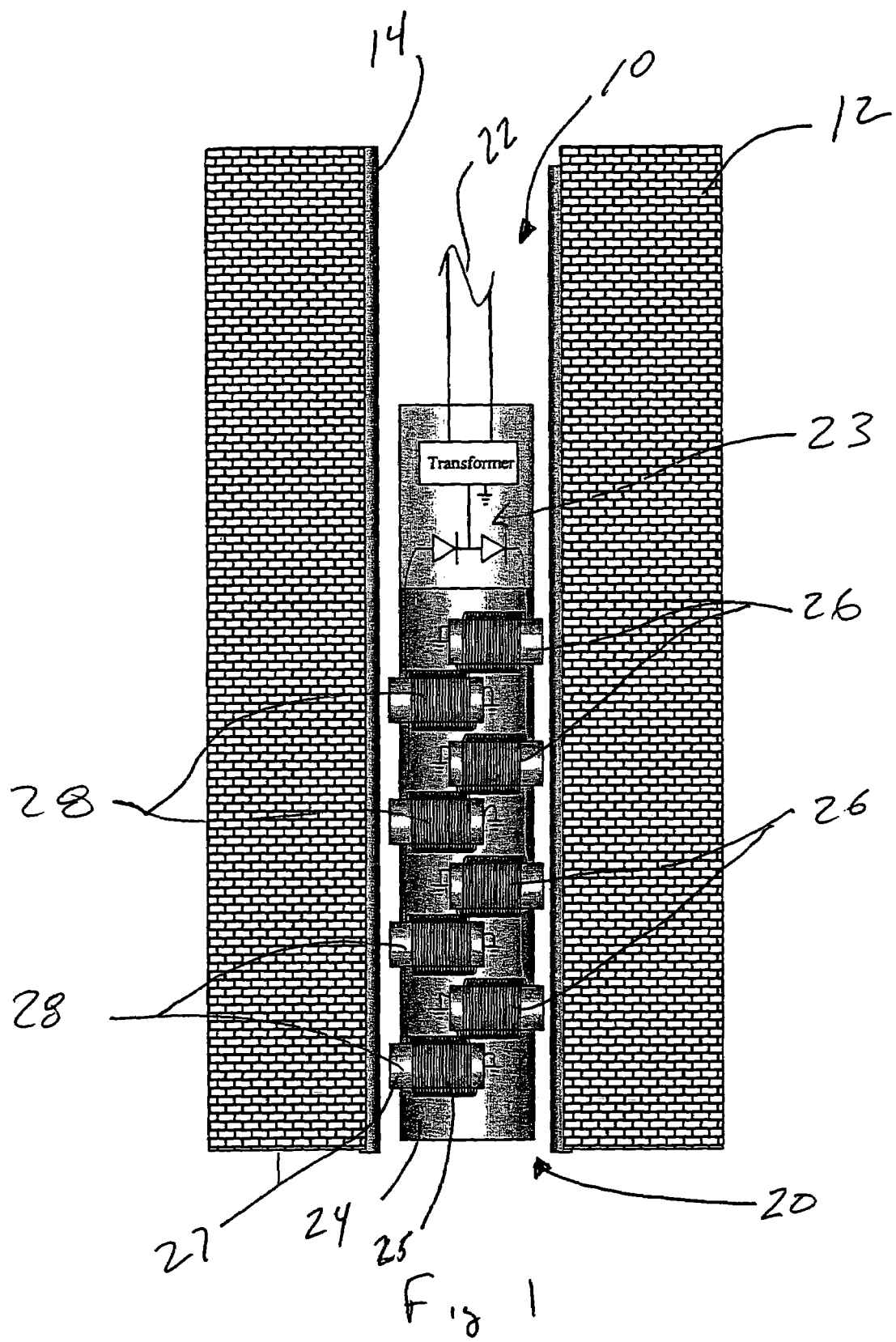
FIG. 1 is an elevation view of a signal generator constructed in accordance with embodiments of the invention.

Referring now to FIG. 1, wellbore 10 is formed in formation 12 and surrounded by steel casing 14. Signal generator tool 20 is suspended within wellbore 10 by wireline 22, which provides physical support and electrical communication with a surface control station (not shown). Tool 20 comprises body 24, electrical system 23, and electromagnet assemblies 26 and 28. Each electromagnet assembly 26, 28 includes coiled winding 25 and core 27.

Electrical current is supplied to tool 20 via wireline 22. The application of current to the coiled winding 25 of electromagnet 28 magnetizes core 27 and generates a magnetic force that pulls tool 20 and casing 14 toward each other. The magnetic force generated between the electromagnets and the casing is not dependent on fluid filling the wellbore. Thus, the tool can also be operated in a fluid-filled or gas-filled wellbore. By arranging electromagnet assemblies 26 opposite electromagnet assemblies 28, as shown in FIG. 2, tool 20 can be made to vibrate by alternatingly applying current to the electromagnet assemblies.

Tool 20 may be pulsed, or driven, by a variety of control schemes, such as a rectified sine wave drive sweep or a pulse width modulation scheme. For example tool 20 can be driven by a rectified sine wave drive sweep, such that a magnetic field generated on one side of the tool will pull casing 14 towards the tool for one half-cycle of the drive sweep. The next half-cycle of the drive sweep will generate a magnetic field on the opposite side of tool 20, thus pulling the casing 14 in the opposite direction. Thus, by applying the rectified sine wave drive sweep to tool 20, casing 14 can be made to vibrate. The vibration generated by the interaction of tool 20 and casing 14 is transferred into formation 12 as a seismic signal. The rectified sine wave can be controlled to regulate the frequency and amplitude of the seismic signal that is generated in formation 12.

Figure 2:
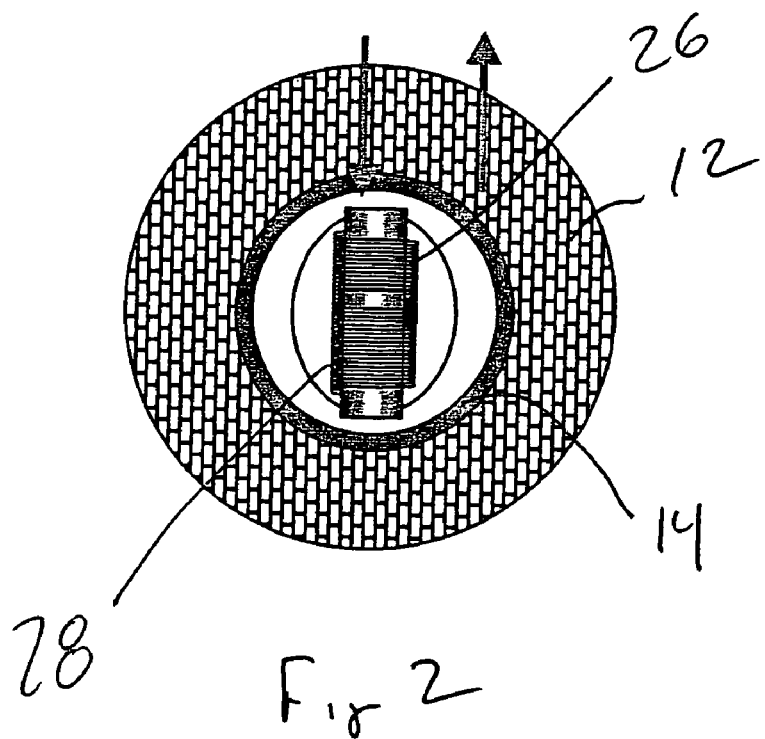
FIG. 2 is a plan view of dipole source constructed in accordance with embodiments of the invention.
Figure 3:
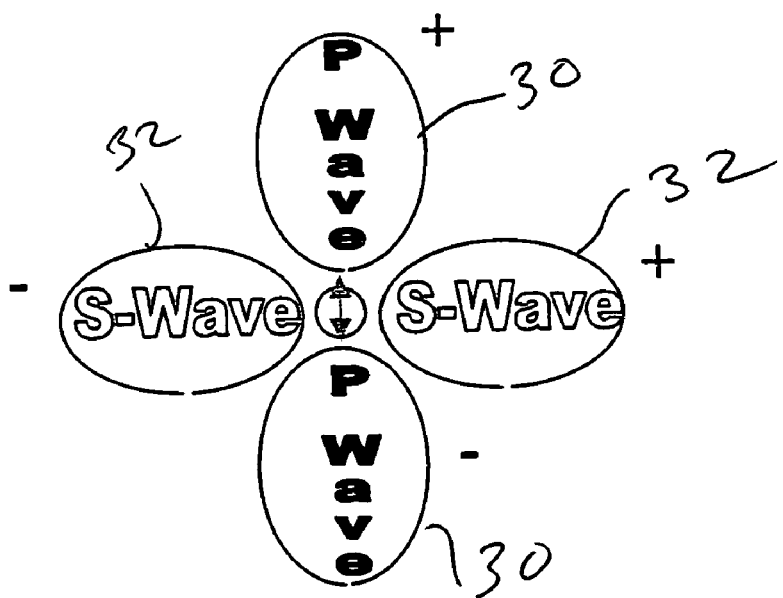
FIG. 3 is a schematic illustration depicting the radiation pattern of a dipole source.

Thus, the dipole source shown in FIG. 2 produces a seismic radiation pattern as shown in FIG. 3. P-waves 30, or compressional waves, are generated along the direction in which the electromagnets are oriented. S-waves 32, or shear waves, are generated perpendicular to p-waves 30. This directional pattern may be suitable for some applications, such as stimulation and reverse VSP. In other applications, such as many crosswell applications, it is necessary to generate compressional waves in all directions.

Figure 4:
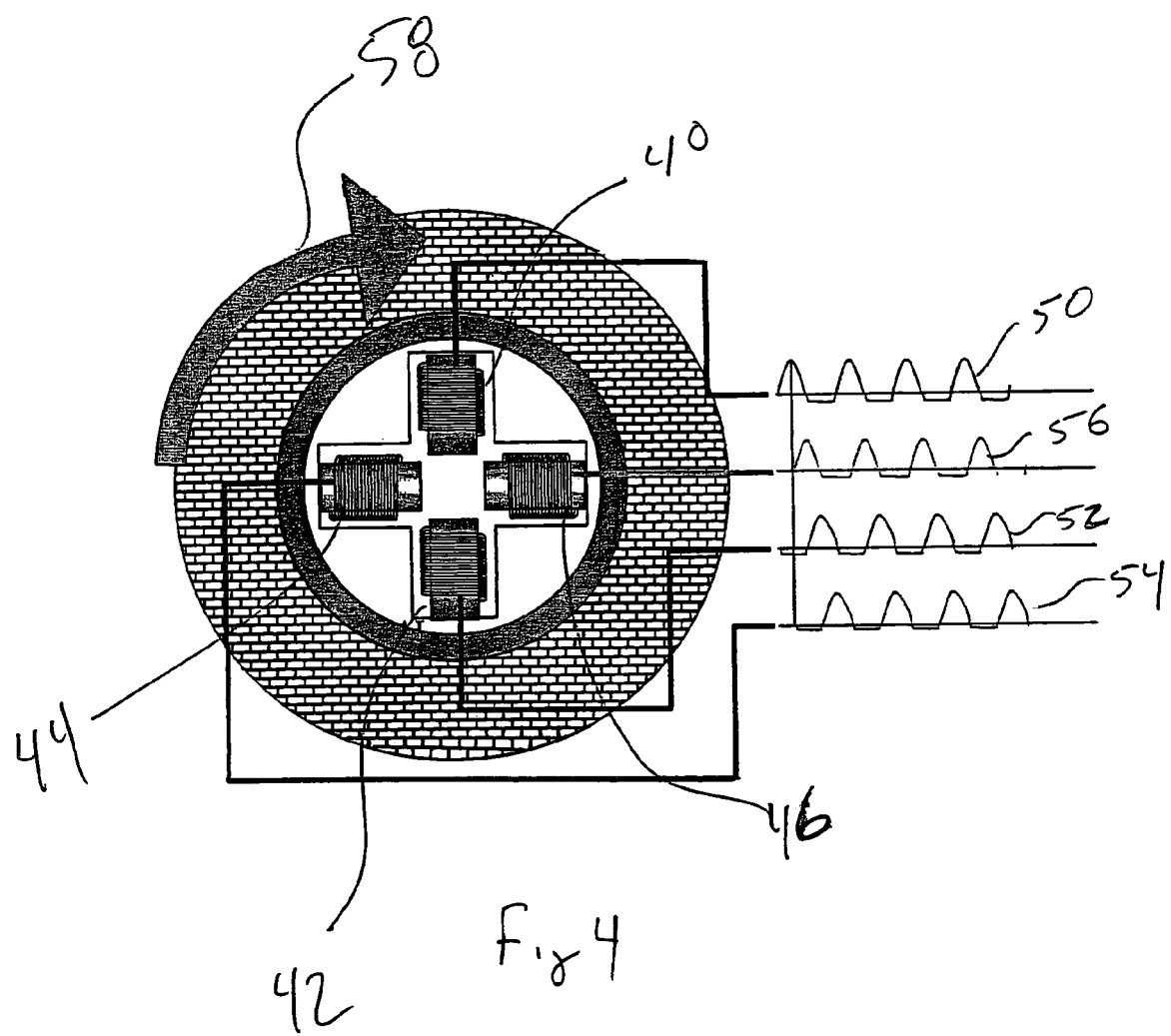
FIG. 4 is a plan view of a cross-dipole source constructed in accordance with embodiments of the invention.

In order to generate compressional waves in all directions, tool 20 may be arranged with four electromagnets 40, 42, 44, and 46, as shown in FIG. 4. Electromagnets 40 and 42 are arranged on opposite sides of tool body 24. Electromagnets 44 and 46 are also on opposite sides of body 24 but are oriented ninety degrees from electromagnets 40 and 42. Electromagnets 40, 42, 44, and 46 are driven with waveforms 50, 52, 54, and 56, respectively. In this manner, the electromagnets are activated in a clockwise manner such that electromagnet 40 is activated, followed by electromagnet 46, electromagnet 42, and electromagnet 44 before electromagnet 40 is activated again.

Thus, electromagnets 40, 42, 44, and 46 generate magnetic forces that will establish a rotating casing displacement in the direction of arrow 58. This rotating casing displacement will generate an orbital vibration in the formation that can be precisely controlled by varying the applied waveforms and is produced by a tool having few, if any, moving parts.

Electromagnets 40, 42, 44, and 46 may also be operated as pairs in an alternating manner. Electromagnets 40 and 42 can be operated to create displacement in a first direction and then electromagnets 44 and 46 can be operated to create displacement in a second direction that will be orthogonal to the first direction. In this manner, the tool effectively generates two distinct vibrational signals in two orthogonal directions. These signals can be received and analyzed to generate three-dimensional data.

Each side of the source is shown in FIG. 4 as being driven with an out of phase sine wave. In practice, magnetic hysteresis may keep the source clamped to one side of the casing, resulting in reduced casing displacement. To avoid this, each electromagnet may have to be turned off, such as by reversing the current slightly after the energizing cycle. In practice, a pulse width modulated drive system may prove to be more efficient. This downhole switching circuit would allow DC power to be applied to the wireline, which would minimize capacitive losses but increase downhole complexity.

Factors affecting output of an electromagnetic signal generator tool include the supply of electrical power, conversion of the supplied power to magnetic force, annulus conditions between the tool and the casing, and the mass of the source. Wellbore deployed, electrically actuated, signal generators can be driven over a standard single-conductor wireline. For example, single-conductor wireline can support 7 amps at 2000V or 14 kW for long periods of time with high reliability. The conversion of this supplied power by the electromagnets is dependent on the construction of the electromagnets, which may employ standard materials, high-temperature superconductors, or other exotic materials. As an example, a standard 12V electromagnet with copper windings and a ferrous core can provide 200 lbs. of magnetic force at 3 amps, or 5 lbs. of force per watt. In this example, the available electrical power (14 kW) could theoretically generate 70,000 lbs. of force.

In certain embodiments, the electromagnets may be U-shaped, parallel-pole electromagnets. A U-shaped electromagnet offers a reduced length of the magnetic circuit and an increased holding force as compared to a similar size cylindrical electromagnet. The cores of the electromagnets may also be laminated in order to improve frequency response.

FIG. 5A shows a signal generator 60 disposed within a casing 70. Signal generator 60 comprises body 62 supporting U-shaped electromagnets 64 and 66. Electromagnets 64 and 66 are oriented on opposite sides of body 62. Signal generator 60 is supported by and powered through wireline 68. In one operational mode, as shown in FIGS. 5B and 5C, both electromagnets 64 and 66 are activated such that casing 70 is attracted to both electromagnets simultaneously. Casing 70 will deflect and form an elliptical shape 72, as shown in FIG. 5C.

Referring not to FIG. 6A a signal generator 74 is disposed within casing 86. Signal generator 74 comprises body 76 supporting U-shaped electromagnets 78 and 80, upper centralizer 82 and lower centralizer 84. Centralizers 82 and 84 keep body 76 centered within casing 86. Signal generator 74 is supported by and powered through wireline 88. In one operational mode, signal generator 74 is operated by alternatingly activating electromagnets 78 and 80. As shown in FIG. 6B, electromagnet 78 is activated, thus deflecting casing 86 in a first direction 90. Referring now to FIG. 6C, electromagnet 78 is then deactivated and electromagnet 80 is activated, deflecting casing 86 in an opposite direction 92. In certain embodiments, additional electromagnets may also be provided at other orientations so as to provide for three dimensional signal generation.

Referring now to FIGS. 7A-7F, signal generator 94 is disposed within casing 104. Signal generator 94 comprises body 96 supporting U-shaped electromagnets 98 arranged on one side of the body. A compliant layer 100 is disposed on the outside of body 96 between electromagnets 98 and casing 104. Referring now to FIGS. 7B and 7C, one mode of operation of signal generator 94 is shown where electromagnets 98 are activated and body 96 is pulled against casing 104, compressing compliant layer 100. When electromagnets 98 are de-activated, compliant layer 100 will push body 96 away from casing 104.

Compliant layer 100 may be a layer of rubber, neoprene, or some other compressible material. The shore hardness of the rubber can be selected for optimum performance. Compliant layer 100 may also, or alternatively, comprise a mechanical spring arrangement, or some other mechanical biasing arrangement, in order to push body 96 away from casing 104. Signal generator 94 can be held in close proximity to casing 104 by applying a DC current to electromagnets 98. An AC current, or series of pulses, can be superimposed on top of the DC to make casing 104 vibrate.

In certain embodiments, as illustrated in FIGS. 7D through 7E, electromagnets 98 can be arranged on two sides of body 96 at 90 degrees apart. Electromagnets 98 can be operated such that one side can be activated (see FIG. 7E) followed by the other side (see FIG. 7F). Operation in this manner generates vibrations in two directions, thus providing a 3-D source.

Figures 8A, 8B:
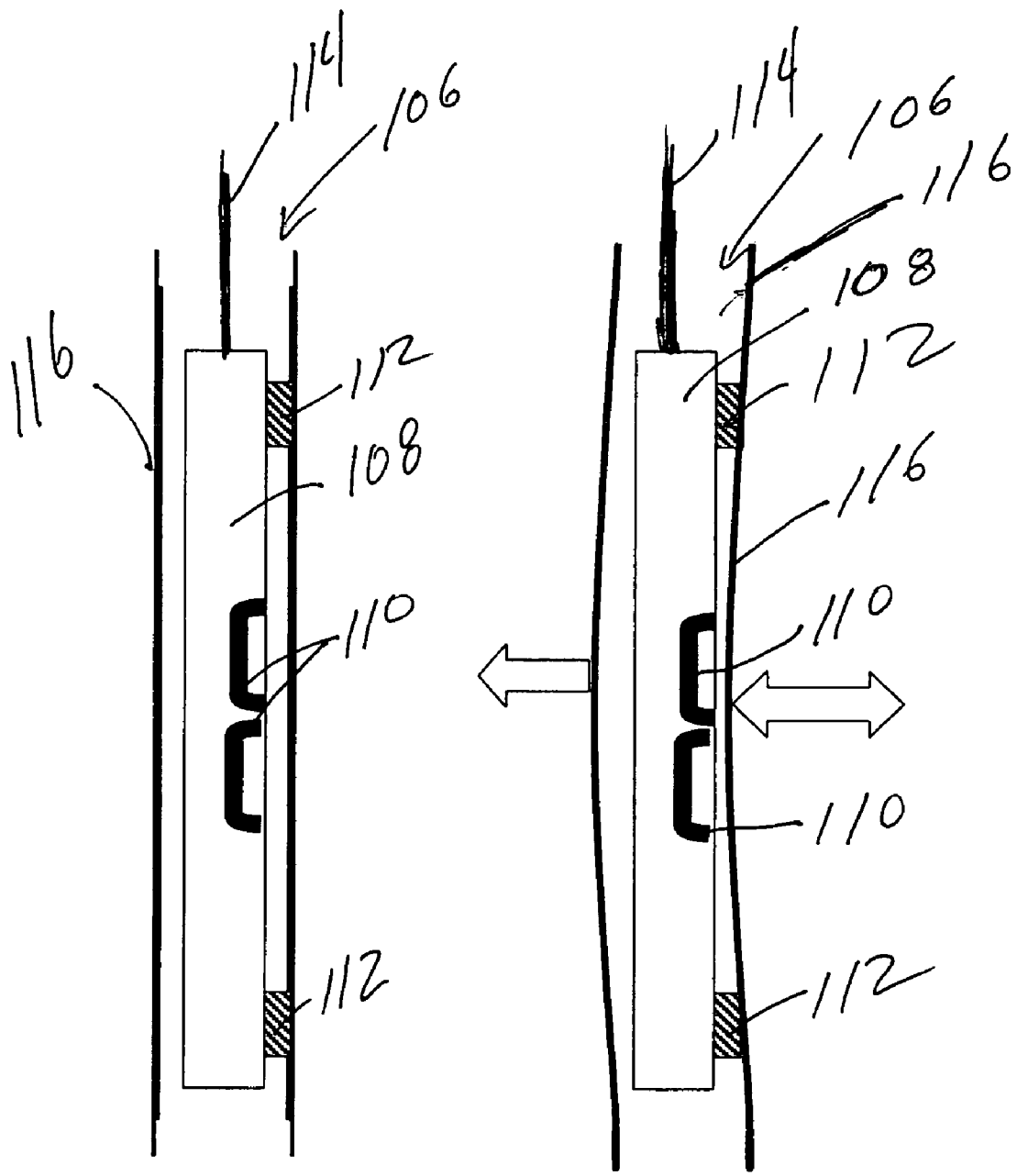
FIGS. 8A-8B illustrate the configuration and operation of a signal generator in accordance with embodiments of the invention.

Referring now to FIGS. 8A and 8B, signal generator 106 is disposed within casing 116. Signal generator 106 comprises body 108 supporting U-shaped electromagnets 110 and stand-offs 112 on either end of the body. Body 108 is supported by and powered through wireline 114. Stand-offs 112 establish and maintain an optimum, or desired, air gap between electromagnets 110 and casing 116. In one mode of operation, as shown in FIG. 8B, activating electromagnets 110 pulls casing 116 and body 108 together. Superimposing an alternating, or pulsed current, will cause the casing source system to vibrate at the applied frequency. Electromagnets and stand-offs may also be provided at other orientations so as to provide for three dimensional signal generation.

The force generated between the electromagnets and the casing increases as the distance between them decreases. In more precise terms, the force between the electromagnet cores and the casing varies inversely with the cube of the annular area between the cores and the casing. Thus, minimizing the annular area between a tool and the casing will maximize the potential output of that tool. Of course, a minimum annular area must be maintained in order to allow the casing to displace relative to the tool.

The tool is preferably sized and/or shaped so that the annular area can be minimized while leaving room such that the tool will not become stuck in the casing. An annular area must also be provided for sufficient fluid to pass the tool as it traverses the hole. In certain applications, the annular area will be able to be maintained while the tool is moving. In these applications, the tool can operate while moving. In those applications wherein the annulus can not be maintained, such as due to casing irregularities, then the tool may need to stationary while being used. In certain application, it may also be desired to centralize the tool before being used. In certain embodiments, the tool may be centralized by sensing its position in the wellbore, using any of a variety of known sensing technologies, and then driving the electromagnets so as to keep the tool centralized.

In certain cases, the source output may be significantly higher with the electromagnetic core in contact with the casing. In order to maintain that contact, the cores may be allowed to slide within the electrical windings, which would be fixed to the source body. Seals around each core would be required. The complexity of these seals can be reduced by exposing both ends of each core to wellbore pressure, such as by fluid filling and compensating the source body.

The magnetic force generated between the electromagnets and the casing pulls equally on both the tool and the casing. Because it is the displacement of the casing that is transferred to the surrounding formation to generate seismic signals, the mass of the tool acts as a reaction mass to the displacement of the casing. Therefore, the greater the mass of the tool, the less the tool will move, resulting in greater movement of the casing. In the preferred embodiments, the source mass would be maximized so as to result in little tool displacement and maximum casing displacement. The use of a single conductor wireline, with pull strengths in the thousands of pounds, will allow the use of tools having high masses.

Although embodiments of the tool are described as a seismic signal generator, one skilled in the art would recognize that the tool could be used to generate other vibrational signals in the casing, or other wellbore tubular. For example, similar tools could be used to displace wellbore tubulars in well stimulation or downhole communication operations. While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A signal generator comprising
   a tool body operable to be disposed in a wellbore casing;
   a first electromagnet disposed within said tool body;
   a second electromagnet disposed within said tool body opposite said first electromagnet; and
   a power supply operable to selectively provide electrical current to said first and second electromagnets so as to generate a magnetic force that attracts the wellbore casing to the electromagnets so as to displace the wellbore casing, wherein a signal is generated by the displacement of the wellbore casing.

2. The signal generator of claim 1 wherein the power supply generates electrical current such that said first electromagnet is energized when said second electromagnet is not energized so as to generate a vibrating displacement in the wellbore casing.

3. The signal generator of claim 1 wherein the wellbore casing is filled with a gas.

4. The signal generator of claim 1 wherein said tool body is suspended in the wellbore casing on a wireline.

5. The signal generator of claim 4 wherein said power supply provides electrical current through the wireline.

6. The signal generator of claim 1 further comprising:
   a third electromagnet disposed within said tool body and oriented perpendicular to said first electromagnet; and
   a fourth electromagnet disposed within said tool body opposite said third electromagnet.

7. The signal generator of claim 6 wherein the power supply generates electrical current such that said electromagnets are energized in series so as to generate a rotating displacement in the wellbore casing.

8. The signal generator of claim 6 wherein said tool body is suspended in the wellbore casing. on a wireline.

9. The signal generator of claim 8 wherein said power supply provides electrical current through the wireline.

10. The signal generator of claim 6 wherein the power supply generates electrical current such that said first and second electromagnets are energized and then said third and fourth electromagnets are energized so as to form orthogonally opposed displacements in the wellbore casing.

11. The signal generator of claim 1 wherein said first and second electromagnets each comprise a core movable relative to said tool body.

12. The signal generator of claim 11 wherein the cores of said first and second electromagnets contact the wellbore casing and move relative to said tool body when electrical current is applied to the electromagnets.

13. A signal generator comprising:
    a plurality of electromagnets disposed about a tool body disposed in a wellbore casing; and
    a power supply operable to provide electrical current to said plurality of electromagnets so as to create an attractive magnetic force between the electromagnets and the wellbore casing, wherein the attractive magnetic force generates a displacement of the casing.

14. The signal generator of claim 13 wherein said power supply creates a vibrating displacement of the casing.

15. The signal generator of claim 13 wherein said power supply creates a rotating displacement of the casing.

16. The signal generator of claim 13 wherein said power supply creates a first vibrating displacement and second vibrating displacement, wherein the first vibrating displacement is orthogonal to the second vibrating displacement.

17. The signal generator of claim 13 wherein said plurality of electromagnets comprises a pair of electromagnets oriented in opposite directions.

18. The signal generator of claim 13 wherein said plurality of electromagnets comprises four electromagnets oriented at ninety degree intervals.

19. The signal generator of claim 13 wherein the tool body is suspended in the wellbore casing on a wireline.

20. The signal generator of claim 15 wherein said power supply provides electrical current through the wireline.

21. The signal generator of claim 13 wherein said plurality of electromagnets each comprise a core movable relative to said tool body.

22. The signal generator of claim 21 wherein the cores contact the casing and move relative to the tool body when electrical current is applied to said electromagnets.

23. A method of generating a seismic signal in a formation comprising:
    disposing a tool in a wellbore casing, wherein the tool comprises a plurality of electromagnets;
    supplying electrical power to the tool; and
    selectively applying the electrical power to the electromagnets so as to generate a magnetic force that attracts the wellbore casing to the electromagnet so as to displace the wellbore casing.

24. The method of claim 23 wherein the displacement in the casing is a vibrating displacement.

25. The method of claim 23 wherein the displacement in the casing is a rotating displacement.

26. The method of claim 23 wherein the displacement in the casing comprises a first displacement and a second displacement, wherein the first displacement is orthogonal to the second displacement.

27. The method of claim 23 wherein electrical power is supplied to the tool through a wireline that suspends the tool within the wellbore tubular.

28. The method of claim 23 wherein the tool is sized so as to minimize an annular area formed between the tool and the wellbore casing.

29. The method of claim 23 further comprising centralizing the tool within the wellbore casing by selectively applying electrical current to the electromagnets.

* * * * *